Feb. 12, 1963  L. W. DYER  3,077,525
CIRCUIT INTERRUPTER
Filed Sept. 20, 1954  2 Sheets-Sheet 1

Feb. 12, 1963    L. W. DYER    3,077,525
CIRCUIT INTERRUPTER
Filed Sept. 20, 1954    2 Sheets-Sheet 2

WITNESSES
Edwin E. Bassler
Paul H. Harlow

INVENTOR
Lloyd W. Dyer
BY Ralph H. Swingle
ATTORNEY

United States Patent Office 3,077,525
Patented Feb. 12, 1963

3,077,525
CIRCUIT INTERRUPTER
Lloyd W. Dyer, Beaver, Pa., assignor to Westinghouse
Electric Corporation, East Pittsburgh, Pa., a corporation of Pennsylvania
Filed Sept. 20, 1954, Ser. No. 457,135
12 Claims. (Cl. 200—114)

This invention relates to circuit interrupters and, more particularly, to a circuit interrupter comprising a breaker having a fusible member electrically connected in series relation therewith.

Low-voltage circuit breakers as applied to electric power distribution systems are designed to continuously carry the current for which they are normally rated, and to interrupt fault currents up to their interrupting capacity. Many such distribution systems are, however, capable of full amplitude fault current far exceeding the interrupting capacity of low-cost circuit breakers. Short-circuit currents of such great magnitude have been known to wreck current transformers, circuit breakers, bus duct, etc. before they are interrupted. In order to safely interrupt a full amplitude short-circuit current of, for instance, 100,000 amperes by means of commercially available circuit breakers, it would require the use of such of a such a circuit breaker capable of carrying a continuous load of 4,000 amperes in order to obtain one having an interrupting capacity of 100,000 amperes. The cost of equipping a low-voltage distribution system with such circuit breakers would be exceedingly high.

There are available current-limiting fuses having a rated interrupting capacity of 100,000 amperes. Such fuses do not actually interrupt a current of 100,000 amperes but have the property of limiting the rise of current and of interrupting the circuit quickly, in a fraction of a half cycle, before the instantaneous value of the current has risen to a peak value more than a small fraction of the available short-circuit current of the circuit. Thus when a current-limiting fuse is rated as having an interrupting capacity of 100,000 amperes, it means that the fuse will safely interrupt a circuit in which 100,000 amperes would flow when subjected to a short circuit, if the current limiting function of the fuse were not present. The peak value of the instantaneous current actually interrupted by such a fuse may be only about 10,000 to 25,000 amperes even though the available short-circuit current is 100,000 amperes.

This current-limiting action is very desirable in that it protects the circuit, and the apparatus connected therein, from the destructive effects of the maximum available short-circuit current. On the other hand, the use of current-limiting fuses has a number of disadvantages as compared with the use of circuit breakers. For one thing, the current-limiting fuse is a relatively expensive type of fuse and if the circuit is one which is subject to frequent small overloads or to relatively high-resistance short circuits, the cost of repeatedly replacing the fuses becomes a large item. In such instances, the added cost of current-limiting fuses is largely wasted since the current-limiting action is not required except during those infrequent instances when there is a direct short circuit. No such expense is involved with circuit breakers, since the handle of the breaker is merely manipulated to reclose the contacts after an overload or short circuit.

Another disadvantage in the use of fuses is that a fault on a single conductor of a three-phase circuit may blow only one fuse with the result that single-phase power is supplied over the other conductors. This can result in the burning out of motors or other equipment which may continue to operate on single phase, though designed for three-phase operation. Such single-phase operation may then cause blowing of one or both of the remaining fuses, thus increasing the cost of restoring service by the cost of one or two additional fuses, even though the original fault below only one fuse.

Circuit breakers have the additional advantage over the use of fuses since anyone may quickly and safely restore service by manipulation of the insulated handle of the breaker. In contrast with this, much production time may be lost when fuses have to be replaced, since in commercial buildings and industrial plants, fuses are often enclosed for safety reasons in locked enclosures and much time may be lost before the building or plant electrician is located and can come and test for the blown fuse and replace it.

An object of the invention is to provide a circuit interrupter which largely retains the advantages set forth above of circuit breakers over fuses and at the same time has the desirable current-limiting function of current-limiting fuses when there is a heavy short circuit, without requiring the use of an expensive circuit breaker of high interrupting capacity.

It is an object of this invention to so combine and correlate a low-cost circuit breaker with current-limiting fuses of higher interrupting capacity than the breaker, that the circuit breaker functions to clear most faults within the interrupting capacity of the breaker without blowing the current-limiting fuses, and the fuses limit the current rise and clear the fault on rather infrequent operations where the short-circuit current is above the interrupting capacity of the breaker. This largely avoids the expense, inconvenience and outage time incident to the renewal of fuses on most operations and at the same time the current-limiting action of the fuses protects the circuit breaker and other equipment against the destructive effect of excessive short-circuit currents.

A further object is to provide a combined circuit breaker and current-limiting fuse circuit interrupter in which the circuit breaker protects the fuses and prevents single phasing in at least some instances, while the fuses protect the breaker against excessive current. This is accomplished by having the circuit breaker trip upon the blowing of one or more of the fuses so that if the fault is a short circuit on one phase only, which blows only one fuse, the opening of the breaker opens all three phase conductors. This protects the equipment from damage by single-phase operation, and also reduces the number of times that more than one of the relatively expensive current-limiting fuses has to be replaced.

An important object of the invention is to provide a unitary circuit interrupter having an insulating enclosing housing comprising a base and cover for housing a circuit breaker in which at least the base is extended to receive and support current-limiting fuse means.

Another object of the invention is to provide a circuit interrupter embodying a circuit breaker having current-limiting fuse means electrically connected in the circuit directly in series relation with the circuit breaker, with no branch circuit being taken off between the fuse and circuit breaker, and all being mounted on a common base.

Another object of the invention is to provide a circuit interrupter comprising a circuit breaker and current-limiting fuse means connected in series therewith, the fuse means having a higher normal current-carrying capacity and a higher interrupting capacity than the normal current-carrying capacity and the interrupting capacity, respectively, of the circuit breaker and being mounted together with the circuit breaker on a single base of molded insulating material.

Another object of the invention is to provide a circuit interrupter comprising a circuit breaker and fuse means according to the preceding paragraphs wherein cover means is provided which may be sealed to protect at least the trip unit from being tampered with, but which sealed cover need not be removed to replace the fuses.

Another object of the invention is to provide a circuit controlling apparatus comprising a one-piece base of molded insulating mtaerial having intermediate terminals and terminals at each end of the base, the portion of the base between the intermediate terminals and the terminals at one end of the base serving as the base for circuit breaker means connected to the intermediate terminals and terminals at the one end, and fuse means mounted on the intermediate terminals and the terminals at the other end of the base.

The invention, both as to structure and operation, together with additional objects and advantages thereof, will be best understood from the following detailed description thereof when read in conjunction with the accompanying drawings:

Figure 1:
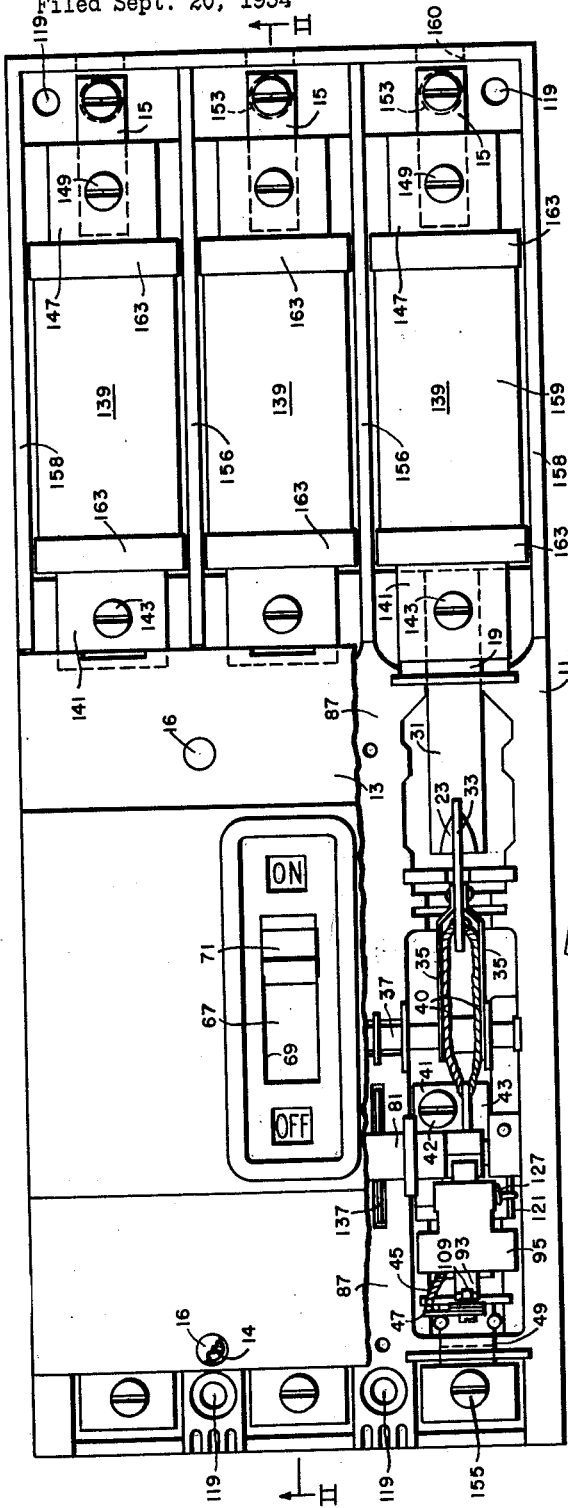
FIGURE 1 is a top plan view, with the cover partly broken away, of a circuit interrupter embodying the principles of the invention.
Figure 2:
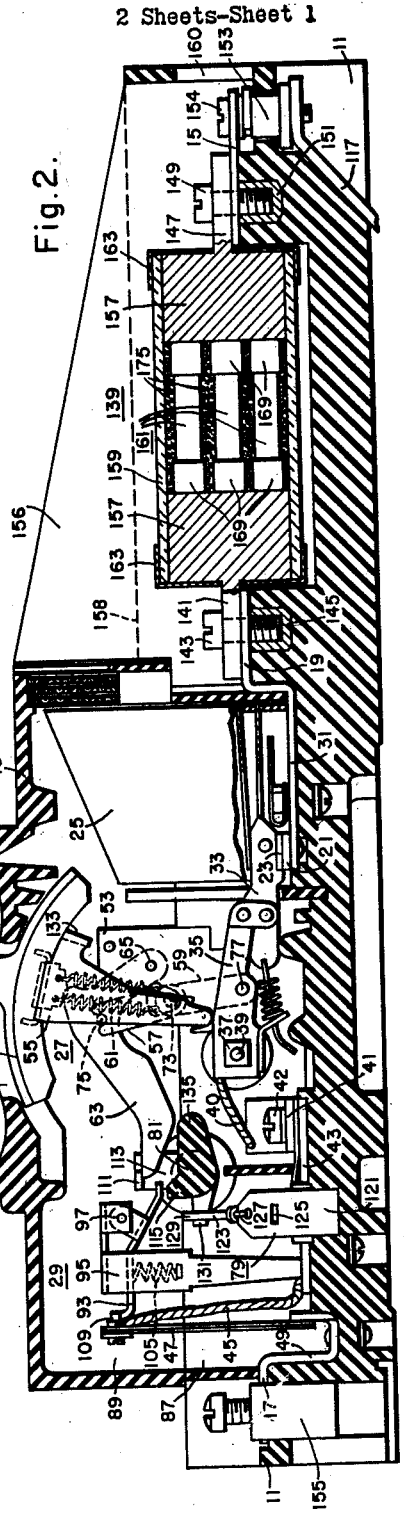
FIG. 2 is a vertical sectional view taken on line II—II of FIG. 1 and looking in the direction indicated by the arrows.

Referring to FIGS. 1 and 2 of the drawings, the circuit interrupter comprises a base 11 of molded insulating material on which the several elements of the circuit breaker mechanism and the current limiting fuse members are mounted. A cover 13 of molded insulating material, which may be fastened or sealed to the base 11 by suitable means, cooperates therewith to form an enclosing housing for the circuit breaker mechanism.

The circuit interrupter is of the multipole type, each pole having line terminals 15 and load terminals 17, disposed at each end of the base 11 and a terminal 19 disposed intermediate the ends of the base. The circuit breaker mechanism may be of the general type disclosed in Sandin Patent No. 2,130,904 issued September 20, 1938, or in Dorfman and Freese Patent No 2,419,125, issued April 14, 1947, the latter being shown and briefly described herein for purposes of illustration. The circuit breaker includes a stationary contact 21, movable contact 23 and an arc extinguisher 25. A common operating mechanism indicated generally at 27 is provided for simultaneously actuating the three movable contacts to open and to closed positions, and a trip device indicated generally at 29 serves to effect automatic opening of the breaker contacts in response to predetermined overload conditions in the circuit through any pole of the breaker.

The terminal 19 forms the outer end of a conducting strip 31 which extends into the housing and rigidly supports the stationary contact 21. The movable contact 23 for each pole is rigidly mounted on a contact arm 33 pivotally mounted on a switch arm 35 comprising a pair of spaced arms suitably mounted on a tie bar 37 which extends across all of the poles of the breaker and supports the switch arms for the several poles for unitary movement to open and closed positions. The tie bar is made of insulating material and is pivotally supported at its ends by pins 39 (only one being shown) engaging bearing members (not shown). The contact arm 33 is connected by means of a flexible conductor 40 to a terminal 41 secured to the base 11 by a screw 42 which also serves to secure one end of a conductor 43 to the base. The other end of the conductor 43 is connected by means of a flexible conductor 45 to the free end of a bimetal element 47 forming part of the trip device 29. The bimetal element 47 has its lower end rigidly mounted on the inner end of a conducting strip 49 which, at its outer end, has the terminal 17 mounted thereon.

The operating mechanism 27 for the breaker is disposed in the center compartment of the housing and is supported by a pair of frame members 53 (only one being shown) secured to the base 11. The operating mechanism comprises a forked operating lever 55, a toggle comprising links 57—59, a pair of overcenter springs 61 and a releasable cradle 63 controlled by the trip device 29. The cradle 63 is pivotally supported on the frame members 53 by a pivot pin 65. The inner ends of the legs of the forked operating lever are rounded and are pivotally seated in rounded notches in the frames 53. An arcuate insulating shield 67 for substantially closing an opening 69 in the cover 13 is mounted on the outer end of the operating lever 55 and a manual handle 71 integral with the shield projects out through the opening 69 to permit manual operation of the breaker mechanism.

The toggle links 57—59 are pivotally connected together by a knee pivot pin 73. The toggle link 57 is pivotally connected by a pivot pin 75 to the cradle 63 and the toggle link 59 is pivotally connected to the switch arm 35 for the center pole of the breaker by a pivot pin 77. The overcenter springs 61 are connected under tension between the knee pivot pin 73 of the toggle 57—59 and the outer end of the operating lever 55.

The trip device 29 includes the bimetal element 47 for each pole of the breaker. The trip device also includes a series overload magnet 79 for each pole of the breaker and a trip bar 81 common to all of the poles. The trip bar 81 is of one piece molded insulating material and is pivotally supported by means of pins (not shown) molded into the ends of the trip bar and pivotally engaging in bearing members (also not shown) in the side walls of the base 11.

The trip bar extends across all of the poles of the breaker through openings in barriers 87 in the base 11 and matching barriers 89 in the cover. The barriers 87 and 89 extend the length of the housing and divide the housing into separate compartments, each of which houses one pole of the breaker. Each pole of the breaker is provided with a trip member 93 pivotally supported on an inverted U-shaped frame 95 by a pivot pin 97. The frame 95 is suitably mounted on the base 11 of the breaker. A spring 105 biases the trip member 93 in a clockwise or tripping direction. The trip member 93 is normally releasably restrained in the position shown by the engagement of the latch end thereof with a latch member 109 on the free end of the bimetal element 47.

A latch member 111 secured to projections 113 integral with the trip bar 81 normally engages the latch end of the cradle 63 and releasably restrains the cradle in operative position.

The right hand end of the trip member 93 is disposed directly above a projection 115 on the trip bar 81 which it is adapted to engage upon release of the trip member to actuate the trip bar as will be more fully described later.

The electromagnet 79 comprises a U-shaped yoke 121 and an armature 123 having a reduced portion 125 which pivotally supports the armature in one leg of the U-shaped yoke. The armature 132 is biased by a spring 127 to unattracted position and is provided with a hook portion 129 which upon operation of the magnet engages a projection 131 on the trip bar 81 to actuate the latter.

The circuit breaker is operated to open position by manipulation of the handle 71 in a counterclockwise direction to the "off" position actuating the overcenter springs 61 to cause collapse of the toggle 57—59 and opening movement of the switch arms 35 for all of the poles of the breaker in a well-known manner.

The breaker is manually closed by reverse movement of the handle 71 from the "off" to the "on" position which causes the springs 61 to move overcenter and straighten the toggle thereby moving the switch arms 35 for all of the poles to the closed position.

The circuit breaker is tripped open automatically by operation of the trip device 29. The bimetal element 47 of any pole, when heated in response to a persistent low overload current, bends in a direction to cause the latch member 109 to release the trip member 93 whereupon the spring 105 snaps the trip member about its pivot causing the end thereof to strike the projection 115 on the trip bar 81 and rock the trip bar in a counterclockwise direction. This action causes the latch member 111 to release the cradle 63 whereupon the overcenter springs 61 rotate the cradle clockwise about its pivot 65. This causes collapse of the toggle 57—59 and opening movement of the switch arms 35 for all of the poles of the breaker.

The circuit breaker is tripped open instantaneously by operation of one of the electromagnets 79, which is energized by the conductor 43 which extends through the U of the U-shaped magnet yoke 121. When energized by overload currents of, for instance, 1000% of normal rated current or a short circuit current the magnet attracts the armature 123 which causes the hook 129 to engage the projection 131 and rock the trip bar 81 thereby instantaneously releasing the cradle 63. This effects automatic opening of the contacts of all three poles in the previously described manner.

Before the contacts can be closed following an automatic opening operation, it is necessary to reset and relatch the mechanisms. This is effected by moving the handle 71 counterclockwise as far as it will go. During this movement a projection 133 on the operating lever 55 engages a shoulder on the cradle 63 and moves the cradle also counterclockwise. Near the end of this movement the free or latch end of the cradle engages a projection 135 on the trip bar 81 and rocks the latter clockwise to a position slightly beyond its normal position. During this movement the projection 115 on the trip bar 81 engages and restores the trip member 93 to its latched position. As soon as the force is removed from the handle 71 a spring 137 (FIG. 1) disposed in a notch in the barrier 87 restores the trip bar to its normal position where the latch member 111 engages and restrains the cradle 63. The contacts are then closed in the previously described manner by movement of the handle to the "on" position.

The arc extinguisher 25 may be of any suitable type, the one illustrated consisting of a plurality of slotted plates of magnetic material into which the arc is drawn and quickly extinguished.

The circuit breaker illustrated, by way of example, may have a continuous current-carrying rating of 100 amperes and an interrupting capacity of 15,000 amperes at 600 volts alternating current, and will safely interrupt fault currents up to its interrupting capacity. Buildings, such as factories, hospitals, apartment buildings, etc. have branch and feeder circuits for lighting and power circuits. Such buildings are at times connected to power sources that are capable of full amplitude instantaneous fault currents in the neighborhood of 100,000 or more amperes which far exceed the interrupting capacity of the circuit breakers. Inserting current-limiting fuses having time-current characteristics as hereinafter described and having a higher interrupting capacity than that of the circuit breaker in series with the circuits through the several poles of the breaker permits the circuit breaker to function normally to interrupt fault currents up to values less than its interrupting capacity, but, should a fault current of greater magnitude than the interrupting capacity of the circuit breaker occur, the current, limiting fuses become effective to interrupt the current.

Each pole of the circuit interrupter is provided with a current-limiting fuse 139, one disconnect contact or blade 141 of which is connected directly to the intermediate terminal 19 by means of a screw 143 threadedly engaging a metal insert 145 molded in the base 11. The other disconnect contact or blade 147 of the fuse 139 is similarly connected to the line terminal 15 by a screw 149 threaded into a metal insert 151 molded in the base 11. The line terminals 15 and load terminals 17 at opposite ends of the base 11 are provided respectively with suitable wire connectors 153 and 155 for connecting the device in an electrical circuit. Such wire connectors are not provided at the intermediate terminals 19 since all of the current is to flow through both the breaker and the fuses.

As shown in FIG. 2 the terminal 15 at the line or fuse end of the circuit interrupting device may be rear-connected to a bus bar (not shown) by means of a bus strap 117 which is connected to the terminal 15 by the connector 153 and a screw 154. By this means the circuit interrupting device may readily be connected in a panelboard, the unitary physical structure being mounted by suitable fastening means inserted through openings 119 provided for that purpose in the base 11. If desired the connector 153 may be replaced by a connector such as 155 so that the circuit interrupting device may be front-connected in the circuit.

The portion of the base 11 in which the fuses 139 are mounted is divided into separate compartments by inner barriers 156 (FIGS. 1 and 2) which are extensions of the barriers 87 and the side walls 158 molded integral with the base 11. The barriers 156 terminate adjacent the end of the cover 13 which is adapted, in the device illustrated, to enclose only the circuit breaker structure. The cover 13 is sealed or otherwise permanently connected to the base 11 in order to protect at least the trip unit portion of the circuit breaker from having its factory calibration tampered with by the user without leaving an indication of such tampering. As shown, the cover is held on by screws 14 covered by sealing wax or other sealing means 16. Since the cover 13 does not extend over the space on the base between the terminals 15 and 19, the fuses may be replaced without breaking the seal 16 and gaining access to the trip unit of the breaker. If the breaker is of the type illustrated in the aforesaid Sandin Patent No. 2,130,904 where a separate sealed cover is provided over the trip unit only, the main cover need not be sealed and can be extended to also cover the fuses, since removal of the cover to replace the fuses will not give access to the trip unit under its own sealed or permanently secured cover.

Openings 160 are provided in the right hand end of the base 11 to receive cables whereby the circuit interrupter may be connected by cables to the electric supply line.

As shown in FIG. 2, the fuse structure comprises a pair of spaced terminal members 157 intergral with the fuse disconnect contacts or blades 141 and 147 which are a fixed part of each fuse and are separable from the terminals 15 and 19 on the base. Each of the main terminals 157 consists of a solid cylindrical block of copper and they are enclosed in a housing 159 of insulating material which also encloses a plurality of fuse units 161. The ends of the composite fuse structure are closed by metal caps 163.

Figure 5:
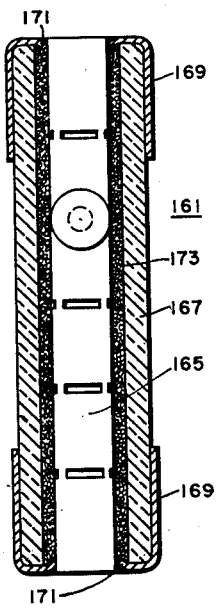
FIG. 5 is an enlarged longitudinal sectional view taken through one of the fuse elements.

Each of the fuse units 161 (FIG. 5) comprises a fusible link 165 preferably of silver disposed in a casing 167 of a strong insulating material. Terminal ferrules 169 are pressed on the ends of the casings 167 and have inwardly formed flanges 171 which are conductively connected by means of a suitable solder to the ends of the fuse link 165. The space in the casing 167 surrounding the fuse link 165 is filled with pure quartz sand indicated at 173 (FIG. 5) which has the property of melting into glass at a temperature of approximately 2000° F. which is required to melt the silver fuse link.

Figure 4:
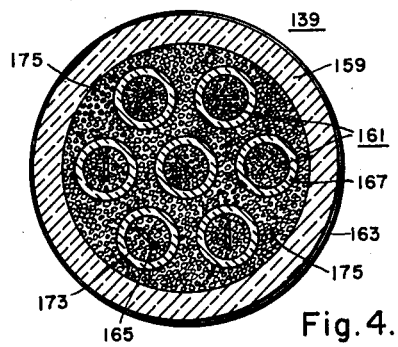
FIG. 4 is an enlarged cross sectional view of a current limiting fuse having a plurality of fuse elements therein.

A number of fuse units 161, depending on the current-carrying capacity required of the composite fuse, are firmly mounted in the housing 159 between the cylindrical copper blocks or terminals 157 (FIG. 2) and the space inside the housing 159 between and surrounding the fuse units 161 is filled with pure quartz sand as shown at 175 (FIGS. 2 and 4).

Figure 3:
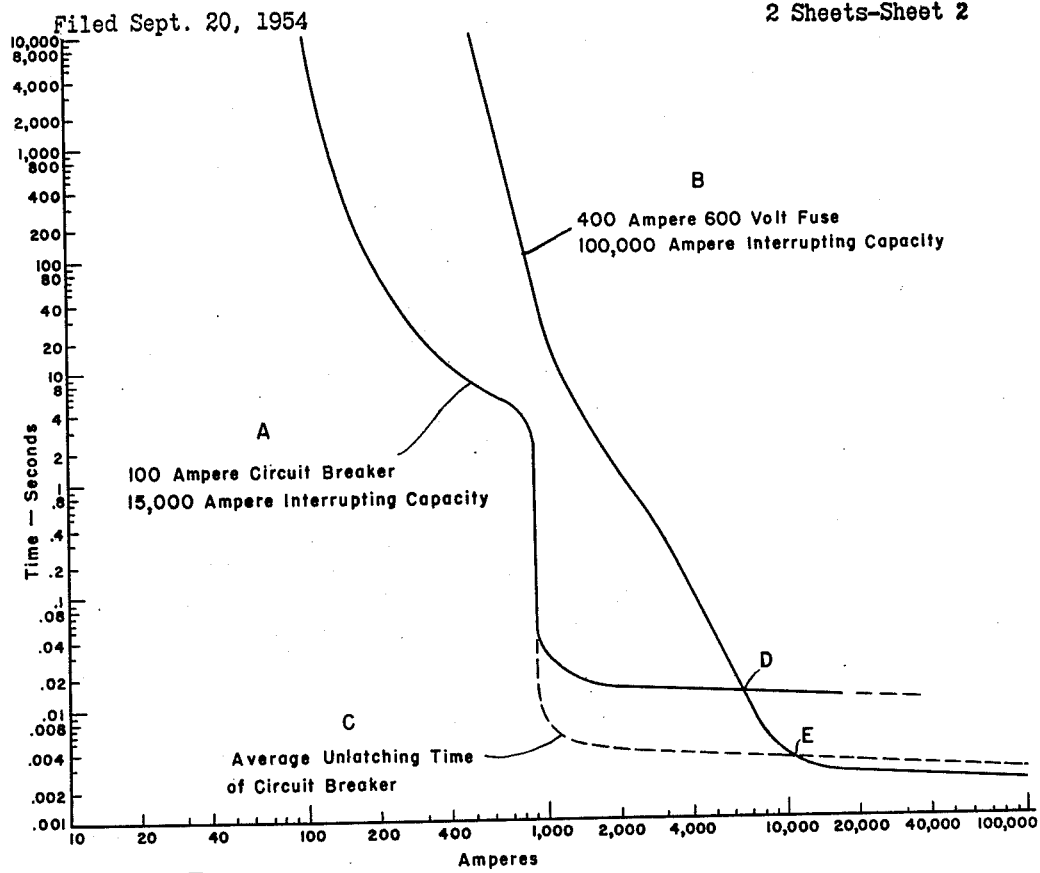
FIG. 3 is a diagram showing the time-current characteristics of a conventional circuit breaker and a current-limiting fuse.

The composite fuses 139 illustrated are rated for continuous current-carrying capacity considerably more than (usually several times) the normal current rating of the circuit breaker. If, by way of example, the circuit breaker is a 100 ampere breaker, the current-limiting fuse may be a 400 ampere device with an interrupting capacity of 100,000 available amperes at 600 volts. Referring to FIG. 3 of the drawings, the curve A illustrates a typical time-current interrupting characteristic of a 100 ampere circuit breaker of 15,000 amperes rated interrupting capacity at 600 volts alternating current. The upper curved part of the curve A represents the time-delay action of the thermal bimetal trip element 47. Beneath this is the substantially straight and almost vertical part of the curve at about 1,000 amperes, which is in the neighborhood of 1000% of the normal current for the 100 ampere breaker of the example illustrated; and as pointed out hereinbefore, the magnetic trip 79 then functions to trip the breaker substantially instantaneously. This nearly instantaneous action takes place on fairly heavy overloads or short circuits, as shown by the lower part of the curve A which approaches the horizontal. The curve B shows the interrupting time-current characteristic of a 400 ampere current-limiting fuse having a rated interrupting capacity of 100,000 amperes at 600 volts, and the curve C illustrates the average unlatching time of the circuit breaker.

It will be seen that curves A and B intersect at point D on the lower part of curve A which approaches the horizontal and where the magnetic trip is effective to trip the breaker quickly. The circuit breaker will interrupt the fault current up to point D as shown by curve A without the fuse blowing since the breaker is faster than the fuse up to some such value of current within the interrupting rating of the breaker. At point D the breaker and the fuse will interrupt the fault current at approximately the same time. On heavier fault currents beyond point D the fuse will clear the fault current before the contacts of the breaker open and the arc drawn would be extinguished if the fuse had not already interrupted the current.

For fault currents between the points D and E the current is not interrupted by the fuse before the circuit breaker operating mechanism is unlatched, with the result that all three poles of the interrupter are opened even though only one fuse has blown. The same thing happens for heavier fault currents considerably beyond the point E, even though the current is interrupted before the trip means unlatches the mechanism. This action takes place because the armature 123 of the electromagnet 79 begins to move and actuate the trip bar 81 with its latch 111 toward unlatched position as soon as the fault current begins to flow, and the inertia of these moving parts causes them to continue in motion after the current is interrupted with the result that the trip member 63 is unlatched and the contacts of all poles are opened after the fault current is interrupted by the fuse which blows.

This action of the magnetic trip of the breaker in causing opening of all three phases, even though a single-phase fault may have blown only one fuse, is very desirable in that it prevents damage to three-phase equipment, such as motors, which could be burned out by single phasing. Also, the circuit breaker thus protects the other fuses from being blown later by the overload caused by single phasing, and reduces the number of relatively expensive current-limiting fuses which must be replaced.

As shown in FIG. 3, the fuse will interrupt a fault current of 10,000 amperes in approximately .2 cycle or .0033 second. This high-speed interruption of the fault current clears the fault before the fault current reaches its maximum peak of the available short circuit current thereby limiting the current flow through the breaker and the system.

The use of high-capacity, current-limiting fuses in series with low-voltage circuit breakers in a distribution system permits the use of circuit breakers of smaller interrupting capacity and reduces the total cost of the installation.

The invention provides a circuit interrupting device comprising a manually and automatically operable circuit breaker having current-limiting fuses of high interrupting capacity in series therewith. The operating characteristics of the two devices are so related that the circuit breaker functions in a conventional manner in response to fault currents within its interrupting capacity, but the fuses become effective to interrupt fault currents greater than those which the circuit breaker can safely interrupt. The circuit interrupting device, including both the circuit breaker mechanism and the fuse elements, is mounted on a one-piece base of molded insulating material having terminals at each end for connecting the unitary circuit interrupter in an electrical circuit and intermediate terminals by which the fuses are connected directly to the stationary contacts of the circuit breaker. The single base is provided with barriers molded integral therewith an extending a considerable portion of the length of the base for isolating both the circuit breaker structure and the fuse for each pole. Cover means is provided for protecting the calibration of the trip means for the circuit breaker structure and this cover need not be removed to replace the fuses.

Having described the invention in accordance with the provisions of the patent statutes, it is to be understood that various changes and modifications may be made in the structural details disclosed and in the arrangement of parts without departing from the spirit of the invention.

I claim as my invention:

1. A circuit interrupter comprising a unitary base of insulating material, an automatic circuit breaker structure mounted on said base at one end thereof, said circuit breaker including main circuit interrupting contacts and a current responsive trip unit electrically connected in series so that all of the current through the circuit breaker flows through both the main circuit interrupting contacts and the current responsive trip unit, sealed or permanently secured cover means of insulating material protecting at least the current responsive trip unit portion of said circuit breaker structure, said trip unit being operable to effect automatic opening of said circuit breaker, current limiting fuse means in addition to said current responsive trip unit mounted on said base at the other end thereof, terminal means mounted on one end of said base connected to one end of said automatic circuit breaker, terminal means on the other end of said base connected to one end of said current-limiting fuse means, intermediate terminal means mounted on said base directly connecting the other end of said automatic circuit breaker to the other end of said current-limiting fuse means, said fuse means being mounted on said base outside of said sealed or permanently secured cover means of insulating material, and said current-limiting fuse means being removable from its terminal means while said sealed or permanently secured cover means protecting the trip means unit portions of said circuit breaker structure remains in place.

2. In a circuit interrupter comprising a base of molded insulating material, a pair of relatively movable contacts mounted on said base and electrically connected in the main circuit through the interrupter for controlling the flow of current in the circuit through said interrupter, a terminal mounted on one end of said base and conductively connected to one of said relatively movable contacts, operating mechanism for said contacts on said base, a cover over said operating mechanism and contacts, tripping means for said operating mechanism including a bimetallic member responsive to the flow of current through said contacts and acting with a time delay to initiate opening of the contacts upon the occurrence of overloads up to a predetermined current, a magnetic trip device also responsive to the flow of current through said contacts and acting substantially instantaneously to initiate opening of the contacts upon the occurrence of heavier overloads or short circuits up to a higher predetermined current, a current-limiting fuse member removably mounted on said base outside of said cover over the operating mechanism and contacts so as to be removable and replaceable while said cover over the operating mechanism and contacts is in place, said current-limiting fuse having a time-current characteristic which is slower than that of said bimetallic member on overloads up to the first said predetermined current, which is slower than that of the magnetic trip device on overloads or short circuits between the first said predetermined current and said higher predetermined current, and which is faster than that of the magnetic trip device on overloads or short circuits above said higher predetermined current, a terminal mounted on the other end of said base and accessible while said cover is in place and conductively connected to one end of said fuse member, and an intermediate terminal mounted on said base and accessible while said cover is in place and conductively connected to the other of said relatively movable contacts and to the other end of said fuse member.

3. In a circuit interrupter comprising a base, circuit interrupting means comprising a pair of relatively movable main interrupter contacts and a fusible element mounted on said base, terminal means mounted on one end of said base conductively connected to one of said relatively movable main interrupter contacts, terminal means mounted on the other end of said base directly connected to one end of said fusible element, intermediate terminal means mounted on said base and connected to the other of said relatively movable main interrupter contacts and to the other end of said fusible element, said fusible element carrying at all times all of the current flowing through said main interrupter contacts, trip means responsive to certain abnormal circuit conditions for effecting opening of said main interrupter contacts and interruption of the current flowing in the circuit of the circuit interrupter, said trip means including thermal time-delay means electrically connected in series with said main interrupter contacts and responsive to the flow of current therethrough, said time-delay means having less time delay than said fusible element on light overload currents for initiating opening of the main interrupter contacts without operation of the fusible element, said trip means also including a magnetic trip device electrically connected in series with said main interrupter contacts and acting quicker than said thermal means and quicker than said fusible element on heavier overloads well within the interrupting capacity of the main interrupter contacts to initiate opening thereof without operation of the fusible element, and said fusible element being effective slower than the magnetic trip device over a substantial range of currents from that current where the magnetic trip device becomes quicker than said thermal means to a heavy overload within the interrupting capacity of the main interrupter contacts and said fusible element being effective quicker than said magnetic trip device and quicker than said thermal time-delay means at least on short-circuit currents greater than the interrupting capacity of the main interrupter contacts to then cause the fusible element to interrupt all of the current flowing in the circuit of the circuit interrupter.

4. A multipole circuit interrupter comprising a base of molded insulating material, barriers extending longitudinally of said base and providing a plurality of compartments, an automatic circuit breaker structure mounted on said base at one end thereof and having a set of separable contact means in each of said compartments, said automatic circuit breaker structure including a manually operable handle for opening and closing all of said contact means, a trip bar and a single latch which when released initiates opening movement of all of the contact means, a plurality of thermal trip members and a plurality of magnetic trip members each responsive to overload currents to cause actuation of the trip bar, current-limiting fuse means mounted beyond the end of the aforesaid circuit breaker structure and at the other end of said base and each carrying all of the current through its respective contact means, said current-limiting fuse means having an interrupting capacity greater than the circuit breaker structure, said fuse means having a time-current characteristic such that the fuse means do not blow when the circuit breaker structure opens upon operation of one or more of said thermal trip members during the occurrence of low-value overloads nor upon operation of one or more of said magnetic trip members during the occurrence of heavier overloads well within the interrupting capacity of the circuit breaker structure and such that one of the fuse means blows and interrupts the circuit upon the occurrence of single-phase short circuits above the interrupting capacity of the circuit breaker structure, said trip bar and latch being actuated in response to short circuit currents just below or above the interrupting capacity of the circuit breaker structure and causing opening of all of the contact means and thereby protecting other of the fuse means from blowing because of single-phasing, terminal means mounted on each end of said base for connecting said circuit interrupter in an electric circuit, and intermediate terminals on said base beyond the end of the circuit breaker structure and between said circuit breaker and said fuse means and directly connecting said circuit breaker to said fuse means.

5. A multipole circuit interrupter comprising a base of molded insulating material, barriers molded integral with said base and forming compartments thereon, an automatic circuit breaker structure mounted on said base and having a set of separable contacts in each of said compartments, said automatic circuit breaker structure including a manually operable handle for manually opening and closing said sets of contacts, a trip bar common to all of the poles of the breaker and a single latch which when released initiates automatic opening movement of all of said sets of contacts, a plurality of thermal trip members each responsive to low overload currents and a plurality of magnetic trip members each responsive to heavy overload currents to cause actuation of said trip bar, current-limiting fuse means having an interrupting capacity greater than the interrupting capacity of said automatic circuit breaker structure connected with each fuse carrying all of the current through one set of separable contacts, said current-limiting fuse means having a time-current characteristic such that the fuse means do not blow upon opening of said contacts caused by operation of one or more of the magnetic trip members by heavy overload currents well within the interrupting capacity of the circuit breaker structure and such that the fuse means do not blow when the circuit breaker structure opens by operation of one or more of the thermal trip members upon the occurrence of low-value overload currents and such that one of the fuse means blows and interrupts the circuit upon the occurrence of a single-phase short circuit current above the interrupting capacity of said circuit breaker structure, said trip bar and latch being actuated in response to short circuit currents just below or above the interrupting capacity of said circuit breaker structure and causing opening of all of the contacts thereby protecting other of the fuse means from blowing because of single-phasing, terminal means mounted on each end of said base for connecting said circuit interrupter in an electric circuit, other terminals mounted on said base for connecting said fuse means between said circuit breaker and the terminals on one end of the base, and said fuse means each having fixed to its ends a pair of disconnect contacts forming a part thereof and directly engageable with and removable from said terminals on the base for the fuse means.

6. A circuit interrupter comprising a base of insulating material, a multi-pole automatic circuit breaker structure mounted on said base at one end thereof, a plurality of current-limiting fuse means mounted on said base at the other end thereof, a plurality of calibrated trip means other than said fuse means for effecting an automatic opening operation of said circuit breaker structure, a single sealed or permanently secured enclosure protecting said plurality of calibrated trip means, said plurality of fuse means being removably mounted outside of said sealed or permanently secured enclosure for the calibrated trip means so that the fuse means can be removed and replaced while the plurality of calibrated trip means are protected by said single enclosure, terminal means mounted on one end of said base connected to one end of said circuit breaker, terminal means on the other end of said base connected to one end of said fuse means, intermediate terminal means mounted on said base directly connecting the other end of said circuit breaker to the other end of said fuse means, said circuit breaker having stationary and movable main contacts mounted on said base of insulating material and electrically connected in series in the main circuit between the terminal means at the two ends of the base of insulating material, said circuit breaker having a manually operable handle member mechanically connected to said movable main contacts, and said handle member mechanically moving said movable main contacts to open and closed positions upon manual actuation of the handle member in opposite directions.

7. A circuit interrupter comprising a base and a cover of insulating material, an automatic circuit breaker structure mounted on said base at one end thereof independently of said cover, fuse means mounted on said base at the other end thereof, said circuit breaker structure including thermal means other than said fuse means for effecting an automatic opening operation of said circuit breaker structure, terminal means mounted on one end of said base connected to one end of said circuit breaker, terminal means on the other end of said base connected to one end of said fuse means, intermediate terminal means mounted on said base directly connecting the other end of said circuit breaker to the other end of said fuse means, said circuit breaker having stationary and movable main contacts mounted on said base of insulating material and electrically connected in series in the main circuit between the terminal means at the two ends of the base of insulating material, said thermal means for causing automatic opening of the circuit breaker being electrically connected in series with said main contacts, and said fuse means being connected in series with said main contacts outside of that part of the electrical circuit between the thermal means and the main contacts, said circuit breaker having a manually operable handle member mechanically connected to said movable main contacts, said handle member mechanically moving said movable main contacts to open and closed positions upon manual actuation of the handle member in opposite directions, said cover of insulating material for said automatic circuit breaker having an opening through which said handle member extends, said cover of insulating material having an extent insufficient to cover the fuse means and said fuse means being removable from the terminal means on the base while said cover remains in position over the automatic circuit breaker.

8. A multipole circuit interrupter comprising a base, a circuit breaker structure mounted on said base at one end thereof and having a set of separable contact means, said circuit breaker structure including a manually operable handle for opening and closing the contacts, a cover member over said separable contact means and having an opening therein through which said manually operable handle extends, said cover member being removable while said circuit breaker structure remains mounted on the base, a trip bar and a single latch which when released initiates opening movement of all of the contact means, and current responsive means including a plurality of magnetic trip members each responsive to heavy currents to cause actuation of the trip bar, current-limiting fuse means mounted at the other end of said base outside of said cover member over the contact means and mounted by means permitting removal and replacement of the current-limiting fuse means while said cover member remains in place over the contact means, said current-limiting fuse means having a normal current-carrying capacity greater than the circuit breaker structure so as not to blow on overloads just over the normal current-carrying capacity of the circuit breaker structure, said current-limiting fuse means having an interrupting capacity greater than the circuit breaker structure, said fuse means having a time-current characteristic such that said fuse means do not blow upon overloads over a substantial range of overloads to which the magnetic trip members are responsive within the interrupting capacity of the circuit breaker structure and said magnetic trip members operating in said range to cause release of said single latch and opening of the contacts, and said time-current characteristic being such that one of the fuse means blows and interrupts the circuit upon the occurrence of single-phase short circuits above the interrupting capacity of the circuit breaker structure, said single latch being released upon the occurrence of at least some single-phase short circuits above the interrupting capacity of the circuit breaker structure and causing opening of all of the contacts and thereby protecting the other of the fuse means from blowing because of single-phasing, terminal means mounted on each end of said base for connecting said circuit interrupter in an electric circuit, intermediate terminals mounted on said base between said circuit breaker, including its current-responsive means, and said fuse means directly connecting said circuit breaker to said fuse means, and mechanism operable to relatch said single latch and reclose all of said contact means by movement of said manually operable handle member through said opening in the cover member while it remains in position over the contact means, whereby blown fuse means may be replaced and the contact means reclosed without removing said cover means.

9. In a multi-pole circuit interrupter, a base, a plurality of line terminals adjacent one end of the base, a plurality of load terminals adjacent the opposite end of the base, a multi-pole automatic circuit breaker and a plurality of current-limiting fuses mounted on said base between said line and load terminals with said fuses positioned on the base beyond one end of the circuit breaker, each of a plurality of the poles of the circuit breaker including time delay and magnetic instantaneous tripping means and main circuit interrupting contacts all electrically connected in series with one of the current-limiting fuses between one of the line terminals and one of the load terminals at the respective ends of the base, said current-limiting fuses being connected in said series circuit outside of the circuit between the time delay means and the main circuit interrupting contacts, said automatic breaker having an operating mechanism with a manually operable handle by which the main circuit interrupting contacts for all of the poles are manually opened and closed together, releasable means operable by any one of the time delay and magnetic instantaneous tripping means to cause said operating mechanism to open the plurality of main circuit interrupting contacts together, a cover having an opening in the front thereof through which the manually operable handle extends, said cover extending over but being removable from the operating mechanism and the main circuit interrupting contacts without extending over the current-limiting fuses, and said current-limiting fuses being removably mounted and being removable and replaceable without removing said cover and while it remains in place over the operating mechanism and main circuit interrupting contacts.

10. A circuit interrupting device comprising a base of molded insulating material, circuit interrupting means comprising a pair of relatively movable main contacts and a fusible element mounted on the front of said base, said relatively movable main contacts and said fusible element being conductively connected in series relation in the circuit and each carrying all of the current through said circuit interrupting device, manual means for manually opening and closing said relatively movable main contacts, thermal and magnetic means each responsive to certain abnormal currents electrically connected in the series circuit through the circuit interrupting device to effect automatic opening of said relatively movable main contacts and interruption of the current flowing in the circuit through the circuit interrupting device, and said fusible element being effective in response to certain other abnormal courrents to interrupt the current flowing in the circuit through the circuit interrupting device in a shorter time than the current could be interrupted by the relatively movable main contacts, a pair of fuse-receiving terminals mounted on said base in the series circuit through the circuit interrupting device outside of the circuit between said thermal and magnetic means responsive to certain abnormal currents and said relatively movable main contacts, said fusible element having fixed to its ends disconnect contacts forming a part thereof and directly engageable with and disengageable from said pair of fuse-receiving terminals mounted on the base, and a cover mounted on said base over said main contacts and over said manual means for opening and closing the contacts, said cover being removable while said contacts and manual means remain in place, and said cover having an extent insufficient to cover said fuse-receiving terminals on the base and permitting said fusible element to be removed from the fuse-receiving terminals on the base while the cover remains in position on the base.

11. A circuit interrupter comprising a base of insulating material, an automatic circuit breaker structure mounted on said base at one end thereof, fuse means mounted on said base at the other end thereof beyond the end of the automatic circuit breaker structure, said fuse means having fixed to each end thereof a disconnect contact forming a part thereof current responsive means other than said fuse means and forming part of the automatic circuit breaker structure for effecting an automatic opening operation of said circuit breaker structure, terminal means mounted on one end of said base connected to one end of said circuit breaker, terminal means on the other end of said base connected independently of said current-responsive means to the disconnect contact on one end of said fuse means, intermediate terminal means mounted on said base directly connecting the other end of said automatic circuit breaker to the disconnect contact on the other end of said fuse means, said automatic circuit breaker having stationary and movable main contacts mounted on said base of insulating material and electrically connected in series in the main circuit between the terminal means at the two ends of the base of insulating material, said automatic circuit breaker having a manually operable handle member mechanically connected to said movable main contacts, said handle member mechanically moving said movable main contacts to open and closed positions upon manual actuation of the handle member in opposite directions, a cover of insulating material for said automatic circuit breaker having an opening through which said handle member extends, said cover of insulating material being removable while said handle and main contacts remain in place on the base, and said cover having an extent insufficient to cover the fuse means and said fuse means being removable with the disconnect contacts fixed thereto separable from the terminal means on the base while said cover remains in position over the automatic circuit breaker.

12. In a multi-pole circuit interrupter, a base, a plurality of line terminals adjacent one end of the base, a plurality of load terminals adjacent the opposite end of the base, a multi-pole circuit breaker and a plurality of current-limiting fuses mounted on said base between said line and load terminals, a plurality of intermediate terminals mounted on said base, a disconnect contact fixed to each end of each fuse to form a part thereof and each engageable with and separable from one of said terminals on the base, each of a plurality of the poles of the circuit breaker including time delay and magnetic instantaneous tripping means and main circuit interrupting contacts all electrically connected in series with one of the current-limiting fuses between one of the line terminals and one of the load terminals at the respective ends of the base with said current-limiting fuses electrically connected in said series circuit outside of the circuit between said time delay and magnetic instantaneous tripping means and said main circuit interrupting contacts, said circuit breaker having an operating mechanism with a manually operable handle by which the main circuit interrupting contacts for all of the poles are manually opened and closed together, releasable means operable by any one of the time delay and magnetic instantaneous tripping means to cause said operating mechanism to open the plurality of main circuit interrupting contacts together, a cover having an opening in the front thereof through which the manually operable handle extends, said cover extending over the operating mechanism and the main circuit interrupting contacts without extending over the current-limiting fuses, said cover being removable while said operating mechanism, said main circuit interrupting contacts and said manually operable handle remain in place, and said current-limiting fuses being removably mounted on said terminals on the base for electrical disconnection at said disconnect contacts fixed to the fuses and being removable and replaceable without removing said cover and while it remains in place over the operating mechanism and main circuit interrupting contacts.

References Cited in the file of this patent

UNITED STATES PATENTS

| | | |
|---|---|---|
| 1,159,547 | Tate | Nov. 9, 1915 |
| 1,192,974 | Anderson | Aug. 1, 1916 |
| 1,232,412 | Van Valkenburg | July 3, 1917 |
| 1,254,067 | Platt | Jan. 22, 1918 |
| 2,130,904 | Sandin | Sept. 20, 1938 |
| 2,330,690 | Dannenberg | Sept. 28, 1943 |
| 2,376,789 | Leonard | May 22, 1945 |
| 2,416,951 | Prince | Mar. 4, 1947 |
| 2,419,125 | Dorfman et al. | Apr. 15, 1947 |
| 2,421,853 | Scott | June 10, 1947 |
| 2,473,196 | Dannenberg | June 14, 1949 |
| 2,548,617 | Purpura | Apr. 10, 1951 |
| 2,574,093 | Edmunds | Nov. 6, 1951 |
| 2,599,646 | Kozacka | June 10, 1952 |
| 2,843,702 | Edmunds | July 15, 1958 |

FOREIGN PATENTS

| | | |
|---|---|---|
| 40,259 | Sweden | July 20, 1912 |
| 2,733 | Great Britain | Feb. 4, 1909 |
| 13,522 | Australia | Dec. 13, 1934 |

UNITED STATES PATENT OFFICE
CERTIFICATE OF CORRECTION

Patent No. 3,077,525 February 12, 1963

Lloyd W. Dyer

It is hereby certified that error appears in the above numbered patent requiring correction and that the said Letters Patent should read as corrected below.

Column 1, line 26, strike out "of a such"; column 2, line 13, for "below" read -- blew --; line 37, after "on" insert -- the --; column 3, line 23, for "mtaerial" read -- material --; line 66, for "April 14, 1947" read -- April 15, 1947 --; column 4, line 58, after "bar" insert -- 81 --; column 5, line 11, for "132" read -- 123 --; column 6, line 19, for "current, limiting" read -- current-limiting --; column 7, line 13, for "casings" read -- casing --; column 9, line 11, strike out "means", second occurrence; column 12, line 65, strike out "the", first occurrence; column 13, line 53, for "courrents" read -- currents --; column 14, line 5, after "thereof" insert a comma.

(SEAL)
Attest: Signed and sealed this 17th day of December 1963.

ERNEST W. SWIDER
Attesting Officer

EDWIN L. REYNOLDS
Acting Commissioner of Patents